Dec. 19, 1922.
W. BROADBRIDGE ET AL.
PURIFICATION OR EXTRACTION OF SOLUBLE SUBSTANCES.
FILED JUNE 13, 1922.
1,439,061.
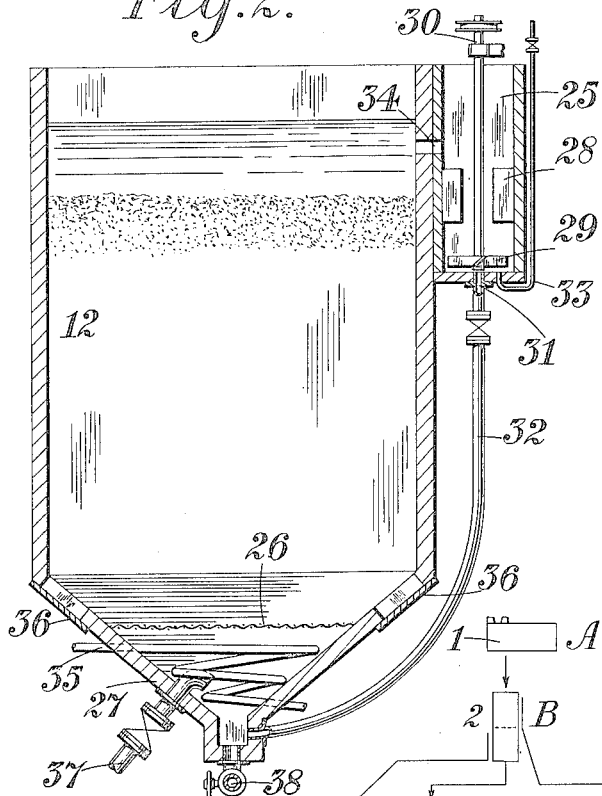
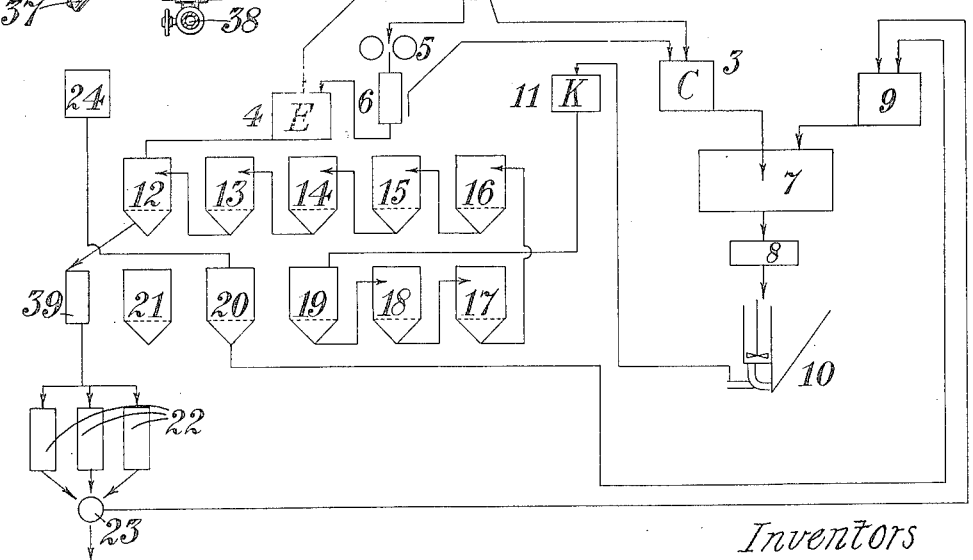
Inventors
Walter Broadbridge
Edwin Edser
William George Sellers
By Williams & Pritchard
Attorneys Patented Dec. 19, 1922.

1,439,061

UNITED STATES PATENT OFFICE.

WALTER BROADBRIDGE, EDWIN EDSER, AND WILLIAM GEORGE SELLERS, OF LONDON, ENGLAND, ASSIGNORS TO MINERALS SEPARATION NORTH AMERICAN CORPORATION, OF NEW YORK, N. Y.

PURIFICATION OR EXTRACTION OF SOLUBLE SUBSTANCES.

Application filed June 13, 1922. Serial No. 568,046.

*To all whom it may concern:*

Be it known that we, WALTER BROADBRIDGE, EDWIN EDSER, and WILLIAM GEORGE SELLERS, all residing in London, England, British subjects, have invented certain new and useful Improvements in the Purification or Extraction of Soluble Substances, of which the following is a specification.

This invention consists in improvements in or relating to the purification or extraction of soluble substances contained in a mixture of solids including insoluble finely divided impurities. The invention has been primarily devised for application to the treatment of "caliche," the crude material from which sodium nitrate is extracted, but the invention is also applicable to the extraction from crude natural deposits of other soluble substances. The process is carried out with a hot solvent in the case of such substances as caliche the characteristic of which is that they are largely soluble in hot liquor and can be crystallized out of solution by cooling. For example, borax may be extracted in this manner.

In the existing process of treating caliche it is crushed and the water-soluble constituents are dissolved out by hot water, and the solution is concentrated, decanted from the undissolved matter, and allowed to cool, whereupon the crude sodium nitrate crystallizes out. In the existing process the percentage of recovery is very poor, one reason being that if the caliche be crushed only into large lumps (one or two inches in diameter), as is customary, the extraction (dissolving of sodium nitrate) is only partial, while if the crushing is carried much further, slimes are produced which will not readily settle and cannot be economically removed by filtration.

Broadly speaking, we propose to employ a process in which the crude material is crushed to such a degree as to ensure effective extraction of the soluble substance by the solvent liquor, and in which special steps are taken to remove the slimes from the solvent liquor.

We have discovered that where any strong solution of a soluble substance such as sodium nitrate containing slimes in suspension is agitated (preferably with aeration) the slimes tend to become flocculated, and in this condition they are susceptible to flotation.

According to the present invention a process of purifying a soluble substance contaminated with insoluble finely divided impurities consists in treating the contaminated mixture with a solvent to dissolve the soluble substance and produce a contaminated solution, subjecting the contaminated solution to froth-flotation separation to separate impurities, and recovering the desired substance from the purified solution.

When a soluble substance is more readily soluble in hot liquor than it is in cold liquor, as is the case with caliche or borax, the process is carried out with a heated liquor. The soluble substance may thereafter conveniently be recovered by allowing the liquid to cool so that the soluble substance crystallizes out, and the absence of the suspended impurities during the crystallizing operation is advantageous inasmuch as there is no opportunity for the fine slimes to become entangled in the crystals formed.

Conveniently in treating material for the extraction of the soluble portion, the crude ore or the like may be crushed to such a degree as to ensure effective extraction by the solvent liquor. This leads to the production of a considerable amount of fines, the insoluble portion of which tends to remain in suspension in the solvent liquor, and does not readily settle. The coarser particles are therefore separated from the fines, for example by screening, and the fines are treated with the solvent liquor first. The insoluble fines are then removed by froth-flotation, which may be assisted by the addition of suitable agents to assist flocculation of the slimes, and thereafter the clarified or partially clarified liquor is utilized for extraction of the soluble portion from the coarser material. In so doing, the coarser material may be utilized as a filter bed on which any of the fine slimes which have been flocculated, but not floated during the froth flotation, are allowed to settle.

In the accompanying drawings:

Figure 1 is a diagram or flow-sheet illustrating the various steps of the process.

Figure 2 is a detail of one part of the apparatus indicated in Figure 1, in which the coarser material is treated.

The following is a description of one method of carrying this invention into effect, as applied to the treatment of crude caliche. The crude caliche is first crushed to pass an aperture of about half-inch square. The crushing may conveniently be done by passing the crude material through a breaker 1 to reduce it to lumps, one or two inches in diameter. This material may be passed through a trommel 2 having two sections, first to remove the fines, less than one tenth-inch in diameter, and deliver them to a bin 3 and second, to remove particles less than half-inch in diameter and deliver them to a bin 4. Particles which pass through the trommel, that is the oversize, are passed through rolls 5 for further crushing and through a second trommel 6 which removes the fines caused by the second crushing and delivers them also to the bin 3. The other particles pass to the bin 4, or they may be further screened and oversize returned to the rolls 5 before delivery to the bin 4. The fines collected in the bin 3 are mixed in a tank 7 with a suitable quantity of hot circuit liquor, which will in general be liquor derived from previous extraction operations. The tank 7 may for example, be a Pachuca tank or any other suitable form of mixer provided with means of agitation and a heating device.

By this means the sodium nitrate is dissolved with substantial completeness from the fines. The contaminated solution is then preferably introduced into a classifier 8, by means of which those sands which will settle are separated therefrom, whereupon they are filtered and washed, the wash water being sent to the return liquor head tank 9. The contaminated solution or liquor from the classifier contains a large proportion of finely divided material in suspension. This liquor is introduced into an agitation and aeration apparatus 10 of any of the well-known types employed in the froth-flotation process of concentrating ores; for example, it may be introduced into a series of square upright vessels provided with horizontal rotary impellers, and preferably with an inlet for air at the bottom. In this apparatus the liquor is subjected to agitation and aeration with the addition of a suitable small quantity of a flocculating and frothing agent; for example, there may be added, per ton of dry slimes, about 10 lbs. of an oil or mixture of oils, such as a mixture of oleic acid and wood tar. The bulk of the slimes are removed from the liquor in the form of a floating froth, which may be washed and then discharged to waste. Any slimes remaining in the liquor unfloated, are thoroughly flocculated by the agitation and aeration process.

From the flotation apparatus 10, the liquor, largely freed from slime particles, passes to the store tank 11.

The coarser caliche in the bin 4 may be heated by a steam jacket around the bin. From this bin the coarse caliche is filled into a series of upright square extraction vessels which are lettered 12 to 21 in the diagram and are used cyclically. In these vessels, the circuit liquor employed for the extraction is derived from the store tank 11 and consists of the clarified solution which has previously been employed for the extraction of the nitrate from the fines.

The tanks 12 to 21 are provided with false bottoms and steam-heating coils, and the solvent liquor is passed from the store tank 11 first into the tank (say 19) containing the most completely exhausted caliche, and the liquor is afterwards transferred from tank to tank, until it is finally passed through the tank (say 12) containing the fresh caliche, after which the strong liquor is subjected to crystallization in vessels 22, the crystals of sodium nitrate being separated by a centrifugal or vacuum separator 23, and the cold liquor is returned for re-use to the store tank 9. Wash water from a separate tank 24 is employed for finally displacing the liquor from the fully exhausted caliche.

In the present arrangement, each extraction unit comprises two parts, see Figure 2, the extraction tang (12 for example) and the agitation vessel 25. The extraction tank 12 is a large upright tank, conveniently square in horizontal section. It has a false bottom 26, on which the crushed caliche rests, and below the false bottom is a tapering (conveniently pyramidal) bottom 27 down to which the solution passes. At the side of the tank, conveniently near the top, is a small agitation vessel 25 which is conveniently an upright rectangular box, and may be provided with vertical baffles 28. Near the bottom of the agitation vessel 25 is a horizontal impeller 29 driven by a vertical rotatable spindle 30. The inlet 31 to the agitator is near the suction zone of the impeller 29, conveniently at the centre of the bottom of the agitation vessel 25, and to this inlet a conduit 32 leads from the tapered bottom 27 of the extraction tank 12. There is also an inlet 33 for air at the bottom of the agitation vessel 25 (also conveniently in the suction zone of the impeller). The outlet 34 from the agitation vessel leads directly into the top of the extraction tank 12. The agitation vessel 25 may be replaced by a centrifugal pump preferably provided with an air inlet leading to its suction zone.

The caliche may fill the extraction tank 12 for a considerable proportion of its height, so that the level of the solvent liquor is above the top of the caliche. Steam coils 35 are utilized for heating the solvent liquor, and these may conveniently be placed below the false bottom 26. The false bottom may be covered with a 10-mesh screen.

In the lower part of the tank 12, above the false bottom, doors 36 are provided for removal of the caliche residues, and below the false bottom on outlet 37, controlled by a tap, is provided for the strong liquor, and there is also an inlet 38, controlled by a tap, provided below the false bottom to discharge the liquor from one vessel into another.

The tapered bottom 27 should preferably have an angle sufficiently steep to prevent accumulation of fine particles of caliche thereon.

The pipe 32 should be of such a diameter that when the liquid is flowing up through it any fine solid particles present in the liquid will not settle in the pipe but will be carried into the vessel 25.

The liquor that has just passed downwards through the caliche in any tank, together with any fines or slimes which may still remain suspended therein, are drawn by means of the impeller 29 into the agitation vessel 25 and are circulated back through the bed of caliche. To further assist flocculation, if necessary, there may be added a very small proportion of a flocculating agent, such as an oil, as hereinafter described. Any flocculated slime present is deposited on the solid residue of the caliche. In the present process it is arranged that the solvent liquor shall circulate several times through any tank before it is discharged into another tank, thus securing efficient extraction of the nitrates from the caliche in that tank.

As already stated for continuous operation a number of tanks 12–21 are provided. Caliche (preferably preheated in the jacketed hopper 4 to a temperature somewhat above 100° C.) is fed to an empty tank (say 12) and hot liquor that has been previously nearly saturated with nitrate in the other tanks is allowed to flow in from tank 13. This flow should occur from the bottom of tank 13 to the bottom of tank 12 by way of a pipe joining the valve 37 of tank 13 to the valve 38 of tank 12 (see Figure 2). A passage of less saturated liquor takes place simultaneously from the bottom of tank 14 to the top of tank 12 and so on to tank 19, which is kept full by means of return liquor from the tank 11. Circulatory percolation of the liquor downwards through the caliche bed now proceeds in each tank until the hot liquor (at a temperature of 110° C. say) in tank 12 is sufficiently saturated to yield nitrate of commercial purity. On an average the liquor may be circulated three, four or more times through the bed of caliche in each tank, which operation may occupy two hours.

The saturated liquor in tank 12 is then run out into the crystallizing tank, and subsequently 12 is filled from tank 13, while tank 13 is kept full by liquor from tank 14, and so on, to tank 18, which is filled from tank 19, while tank 19 is kept full by heated water from tank 11.

Another tank, say 21, filled with fresh caliche, is now brought into use and filled from tank 12, and tank 19 is disconnected from the circuit so that the tank which was the first becomes the second, and so on throughout the series, and the cycle of operations described above recommences.

The fully extracted residues in 19 are washed and drained, and are thereafter discharged. The drainage liquor is pumped into the head tank 9 for the return liquor and serves to replace the water lost during the cycle.

In the existing method of nitrate extraction it is customary to heat the liquor in the extraction vessels to boiling point: in fact a considerable concentration of the liquor by evaporation is a feature of that known process. In the process according to the present invention a substantially complete extraction can be obtained without heating the circuit liquor above 110° C., and the losses due to evaporation are minimized.

In the process described above, there are three ways in which the amount of water in the circuit is lost, viz: water is carried away with the discharged residues, water is carried away with the crystallized nitrate, and a very small amount of water may be lost by evaporation during the extraction. We have found by investigation that with caliche of low grade it is only possible to secure efficient extraction if the solvent liquor is effectively displaced from the residues before discharge. The most satisfactory way of performing this is to allow the relatively light wash water from tank 24 to flow on to the surface of the stronger liquor (about 1.35 sp. gr.), while the whole subsides very slowly through the bed of caliche.

If the amount of wash water added exceeds the amount of water lost from the circuit by the different ways above referred to, it is necessary to bring the circuit liquor back to its normal quantity, and this can effectively be done by evaporation of the strong liquor in an evaporator 39 immediately before crystallization of the sodium nitrate.

During extraction and circulation, the liquors will be maintained at temperatures increasing from about 30° C. in the tank containing the exhausted caliche, to about 110° C. in the tank containing the liquor ready for crystallization, but boiling of the liquor should not occur in any of the tanks.

The term "caliche" has been used throughout this specification as indicating the raw material containing sodium nitrate, and it will be understood that that term includes the various products, such as costra, ripic, etc., which contain recoverable nitrate.

In this specification the expression "flocculating agent" has been used. It is not possible to state in advance all the substances which may successfully be used as flocculating agents. Fatty acids, such as oleic acid, triglyceride oils and fats, wood tar, glue, starch, soap, also calcium oleate, sodium silicate and sodium aluminate are all effective as flocculating agents.

The invention may also be applied to the extraction of sodium chloride and other naturally occurring soluble salts.

What we claim as our invention and desire to secure by Letters Patent is:—

1. The process of purifying a soluble solid substance contaminated with insoluble finely divided impurities, which consists in treating the contaminated mixture with a solvent to dissolve the soluble substance and produce a contaminated solution, subjecting the contaminated solution to froth-flotation separation to separate impurities, and recovering the desired substance from the purified solution.

2. The process of purifying a solid substance soluble more largely in heated than in cold liquor and contaminated with insoluble finely divided impurities which consists in treating the contaminated mixture with hot liquor to dissolve the soluble substance and produce a contaminated solution, subjecting the contaminated solution to froth flotation separation to separate impurities and crystallizing out the desired substance from the purified solution.

3. The process of purifying a soluble solid substance contaminated with insoluble finely divided impurities, which consists in treating the contaminated mixture with a solvent to dissolve the soluble substance and produce a contaminated solution, subjecting the contaminated solution to froth flotation separation with the addition of a small proportion of an agent which will flocculate the impurities, and recovering the desired substance from the purified solution.

4. The process of purifying a soluble solid substance contaminated with insoluble finely divided impurities, which consists in treating the contaminated mixture with a solvent to dissolve the soluble substance and produce a contaminated solution, subjecting the contaminated solution to froth-flotation separation with the addition of a small proportion of a frothing agent to separate impurities, and recovering the desired substance from the purified solution.

5. The process of purifying a soluble solid substance contaminated with insoluble finely divided impurities, which consists in treating the contaminated mixture with a solvent to dissolve the soluble substance and produce a contaminated solution, subjecting the contaminated solution to froth-flotation separation with the addition of oleic acid to separate impurities, and recovering the desired substance from the purified solution.

6. The process of purifying a soluble solid substance contaminated with insoluble finely divided impurities, which consists in treating the contaminated mixture with a solvent to dissolve the soluble substance and produce a contaminated solution, subjecting the contaminated solution to froth-flotation separation with the addition of oleic acid and wood tar to separate impurities, and recovering the desired substance from the purified solution.

7. The process of purifying a soluble solid substance contaminated with insoluble finely divided impurities, which consists in treating the contaminated mixture with a solvent to dissolve the soluble substance and produce a contaminated solution, subjecting the contaminated solution to froth-flotation separation with the addition of oleic acid and wood tar in the proportion of about 10 lbs. per ton of impurities present to separate impurities, and recovering the desired substance from the purified solution.

8. The process of purifying a solid substance soluble more largely in heated than in cold liquor and contaminated with insoluble finely divided impurities which consists in treating the contaminated mixture with hot liquor to dissolve the soluble substance and produce a contaminated solution, subjecting the contaminated solution to froth-flotation separation with the addition of a small proportion of an agent which will flocculate the impurities to separate impurities and crystallizing out the desired substance from the purified solution.

9. The process of purifying a soluble solid substance contaminated with insoluble finely divided impurities, which consists in treating the contaminated mixture with a solvent to dissolve the soluble substance and produce a contaminated solution, subjecting the contaminated solution to froth-flotation separation to separate impurities, then passing the liquor through a filter to remove any remaining impurities, and recovering the desired substance from the purified solution.

10. The process of purifying a soluble solid substance contaminated with insoluble finely divided impurities, which consists in treating the contaminated mixture with a solvent to dissolve the soluble substance and produce a contaminated solution, subjecting the contaminated solution to froth flotation separation to separate impurities, then passing the liquor downwards through a body of relatively coarse crude material containing the desired soluble substance to filter out remaining impurities and improve the extraction, and recovering the desired substance from the purified solution.

11. The process of extracting a soluble substance from crude solid material containing it in conjunction with associated insoluble matter consisting in crushing the crude material, separating it into coarser and finer grades, treating the finer material with water to dissolve the soluble substance contained therein and produce a solution containing the insoluble fines in suspension, subjecting such solution to froth-flotation separation to separate insoluble fines in the froth, then passing the purified solution through a bed of the coarser particles of crude material, and recovering the soluble substance from the effluent solution.

12. The process of extracting a soluble substance from crude solid material containing it in conjunction with associated insoluble matter consisting in crushing the crude material, separating it into coarser and finer grades, treating the finer material with water to dissolve the soluble substance contained therein and produce a solution containing the insoluble fines in suspension, subjecting such solution to froth-flotation separation with an added agent of the character described to separate insoluble fines in the froth, then filtering the purified solutions downwards, through a bed of the coarser particles of crude material, and recovering the soluble substance from the effluent solution.

13. The process of extracting a substance soluble more largely in heated than in cold liquor from crude material in which the soluble substance is associated with insoluble matter, consisting in crushing the crude solid material, separating it into coarser and finer grades, mixing the finer material with heated solvent liquor and subjecting the solution to froth-flotation so as to remove insoluble fines, then filtering the solution downwards while still hot through a body of the coarser crude material so as to effect extraction therefrom, and crystallizing out the desired substance from the effluent solution.

14. The process which consists in repeatedly circulating a solvent through a bed of solid soluble material containing insoluble impurities, and subjecting the resulting solution to froth-flotation separation to separate out suspended impurities after withdrawal from the bed and before return to it.

In testimony whereof we have signed our names to this specification in the presence of two subscribing witnesses.

WALTER BROADBRIDGE.
EDWIN EDSER.
WILLIAM GEORGE SELLERS.

Witnesses as to the signatures of Walter Broadbridge and Edwin Edser:
  H. C. HANKINS,
  R. G. THYMIL.

Witnesses as to the signature of William George Sellers:
  G. C. THAMGRIP,
  D. A. STRUMY.